(12) United States Patent
Cleveland

(10) Patent No.: US 8,334,345 B1
(45) Date of Patent: Dec. 18, 2012

(54) KIT FOR A SCENIC DISPLAY WITH A WINTER THEME

(76) Inventor: Grant Cleveland, Chagrin Falls, OH (US)

( * ) Notice: Subject to any disclaimer, the term of this patent is extended or adjusted under 35 U.S.C. 154(b) by 376 days.

(21) Appl. No.: 12/315,609

(22) Filed: Dec. 4, 2008

(51) Int. Cl.
*C08L 33/24* (2006.01)
*C08L 33/02* (2006.01)
(52) U.S. Cl. .......................... 525/218; 525/191; 525/221
(58) Field of Classification Search .................. 47/41.01, 47/41.12; 525/50, 191, 218, 221
See application file for complete search history.

(56) References Cited

OTHER PUBLICATIONS

Stormy Weather kit product listing available online at www.discoverthis.com/stormy-weather-kit.html on Sep. 8, 2007.*
Stormy Weather kit information, available online at www.beamazing.com on May 4, 2011.*
Test Tube Wonders Lab in a Bag kit product listing available online at www.stevespanglerscience.com/product/1945 on Oct. 20, 2007.*
Magic Sand product listing, available online at www.stevespanglerscience.com/product/1331 on Nov. 28, 2007.*
Test Tube Wonders Lab in a Bag kit information, available online at www.beamazing.com on May 5, 2011.*

* cited by examiner

*Primary Examiner* — Irina S Zemel
*Assistant Examiner* — Jeffrey Lenihan
(74) *Attorney, Agent, or Firm* — Bryan Cave LLP

(57) ABSTRACT

A kit for making a scenic display with a winter theme and a method for making a scenic display with a winter theme.

4 Claims, 1 Drawing Sheet

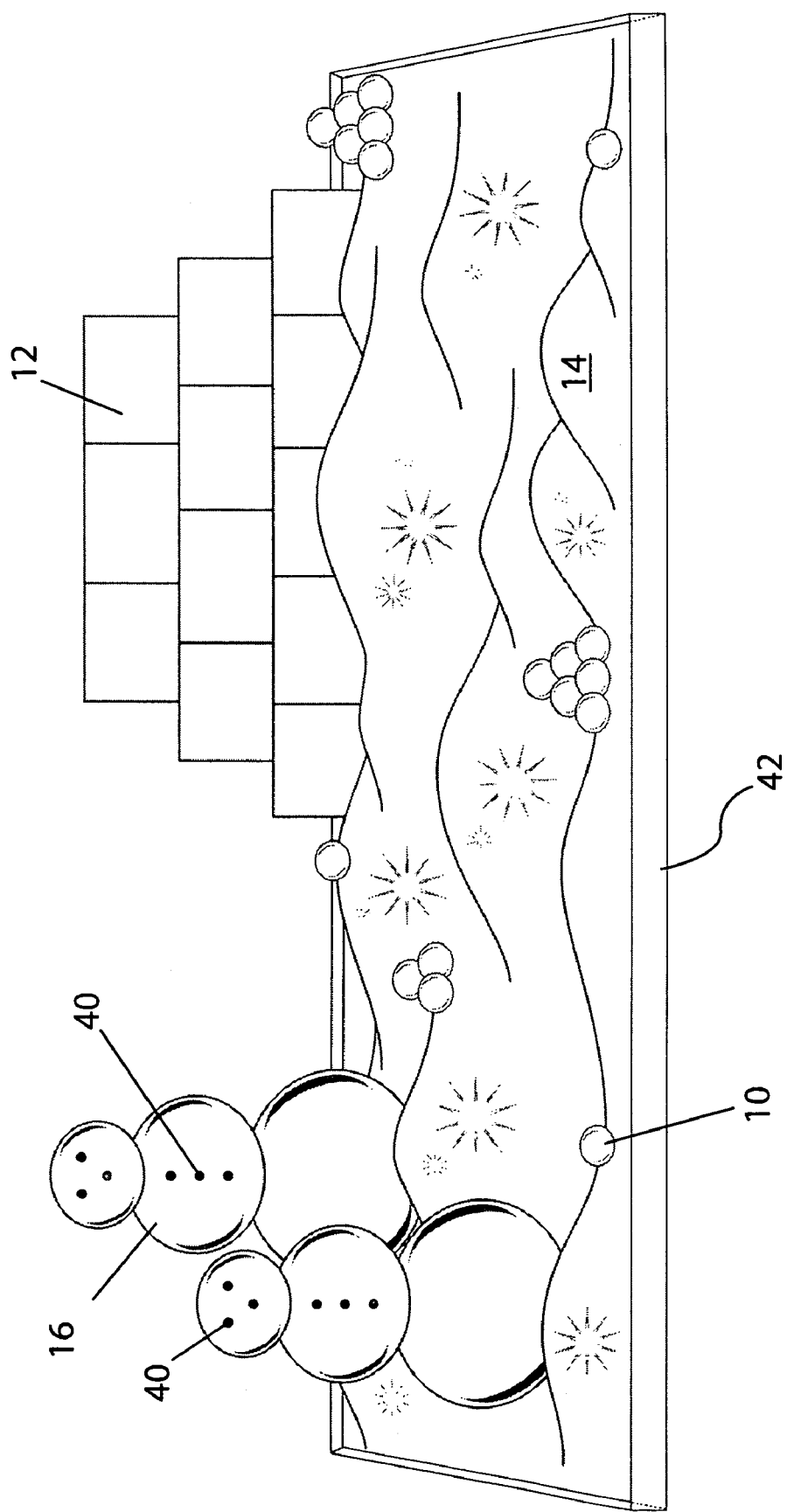

KIT FOR A SCENIC DISPLAY WITH A WINTER THEME

FIELD OF THE INVENTION

The present invention generally relates to a kit, more particularly a kit which provides materials for making a scenic display with a winter theme.

BACKGROUND OF THE INVENTION

Toy kits have long been available to entertain children and adults alike. Toy kits provide children in particular with a creative outlet, and advantageously contain most, if not all, of the components necessary to create a useful or aesthetically pleasing finished product. Toy kits allow a user to create a finished product, and be entertained in the process, without having to first gather together multiple components, especially materials with limited availability and/or those that cannot be found in the appropriate quantities for a small-scale project. Typically, an adult will help one or more children use a toy kit, providing varying degrees of supervision or guidance, depending on the age of the child or children using the kit. Toy kits can be used in the home with a parent supervising a child, in the school with a teacher supervising a class, or in any other environment where a child can be entertained. Toy kits are frequently preferred by adults because they are relatively easy to use and they include at least most of the necessary components. Children also frequently prefer toy kits because they include novel and unusual materials, are entertaining to use, and allow children to create finished products.

Kits with holiday and seasonal themes are popular because they help children create a unique two- or three-dimensional art project that can be placed on display during the appropriate season. For example, kits for dying and decorating eggs are popular in the springtime, kits for carving pumpkins are popular during the Halloween season, and gingerbread house kits are popular during the winter months. However, these kits require a significant investment of time or resources outside of what is included in the kit itself. For example, an egg decorating kit requires hard-boiled eggs, a pumpkin carving kit requires pumpkins, and a gingerbread house kit needs an adult to make and bake the gingerbread. Thus, there is a need for a toy kit that does not require additional materials that are not readily available in a home or school.

SUMMARY OF THE INVENTION

Among the various aspects of the present invention is the provision of a kit for making a scenic display with a winter theme, comprising a first polymer, wherein the first polymer is a super-absorbent polymer in the cross-linked polyacrylamide chemical family; a second polymer, wherein the second polymer is a super-absorbent ionic copolymer of polyacrylamide with acrylic acid and sodium salts; and a third polymer, wherein the third polymer is a cross-linked sodium polyacrylate super-absorbent polymer.

Another aspect of the present invention is the method of making a scenic display with a winter theme, comprising hydrating a first polymer, wherein the first polymer is in the cross-linked polyacrylamide chemical family, hydrating a second polymer, wherein the second polymer is a super-absorbent ionic copolymer of polyacrylamide with acrylic acid and sodium salts, hydrating a third polymer, wherein the third polymer is a cross-linked sodium polyacrylate super-absorbent polymer, and arranging said polymers to create a scenic display.

Briefly, therefore, the present invention is directed to a kit for making a scenic display with a winter theme, and a method of making thereof.

Another aspect of the invention is the inclusion of a tray, decorative accessories, instructions, mixing utensils, sculpting accessories, or any combination thereof, in the kit.

Other objects and features will be in part apparent and in part pointed out hereinafter.

BRIEF DESCRIPTION OF THE DRAWINGS

FIG. 1 is a view of a scenic display with a winter theme that may be created from the kit of the present invention. The stars in FIG. 1 show the snow base 14 shining and sparkling.

DETAILED DESCRIPTION OF THE INVENTION

The present invention is directed to a kit which contains materials for creating a scenic display with a winter theme. The display is centered around resemblances of snow, ice, and various shapes and figures created with snow and ice, such as snowballs, igloos, snowmen, snow forts, and the like. The kit contains materials to create a countertop-sized display. The kit of the present invention allows children considerable creativity in creating the display, by providing the materials yet allowing a child to shape and arrange them to his or her liking. Additionally, the kit requires only water, simple mixing utensils, and minimal adult supervision, which is very convenient for the adult supervisor.

The kit is comprised of at least three different polymers, which, when hydrated, resemble snow or ice. The three different polymers each exhibit different properties when hydrated, thus making them suitable for different aspects of the display. The kit may further comprise any materials helpful for the completion of the display, such as a display tray, an instruction set, mixing utensils, decorative accessories, sculpting accessories, and the like.

The first aspect of the present invention is directed to a first polymer which is provided in various shapes 10 and 12, and which is included in the kit. The first polymer can be provided in any three-dimensional shape, for example, and without limitation, spherical shapes, cubical shapes, pyramidal shapes, cylindrical shapes, star shapes, heart shapes, and the like, or any combination thereof. The polymer which comprises these shapes 10 and 12 is preferably a super-absorbent polymer, which can absorb and retain liquid. Thus, when the shapes 10 and 12 are placed in water or otherwise hydrated, the polymer is able to absorb and retain a large amount of water relative to its own mass. In a preferred embodiment, the polymer is in the crosslinked polyacrylamide chemical family. The polymer can be any color. In a preferred embodiment, the polymer is clear or white.

In a preferred embodiment, the shapes are spherical 10 and Cubical 12. In this embodiment, the spherical shapes 10 are designed to resemble snowballs while the cubical shapes 12 are designed to resemble blocks of ice, such as those out of which an igloo or snow fort could be created.

In a preferred embodiment, the polymer shapes are such that immersion in a liquid, preferably water, for at least four hours will result in a growth such that the hydrated shape is significantly larger than the dehydrated shape. In this preferred embodiment, the hydration process is reversible, and upon dehydration—typically done via exposure to air or a salt—the shapes will return to their dehydrated, original size.

A second aspect of the present invention is directed to a second polymer which can create a snow base 14, and which is included in the kit. This snow base 14 consists primarily of the second polymer, which is preferably a beaded super-absorbent polymer which can absorb and retain a large amount of liquid relative to its own mass. The preferred super-absorbent polymer is such that, when hydrated, it forms a substance similar in look and texture to snow. In a further preferred embodiment, the second polymer is an ionic copolymer of polyacrylamide with acrylic acid and sodium salts. The polymer can be any color. In a preferred embodiment, the polymer is clear or white. In a preferred embodiment, the polymer is granular.

In a preferred embodiment, the second polymer is such that approximately each half-teaspoon of the polymer is best hydrated by approximately eight ounces of water. In this embodiment, the hydration is more effectively brought about by brisk stirring. In a preferred embodiment, the polymer is capable of shining and sparkling when it is briskly stirred with the appropriate amount of water for approximately one minute.

A third aspect of the present invention is directed to a third polymer which is used to create FIG. 16. The polymer of this third aspect is preferably a super-absorbent polymer, more preferably, an instant solid polymer. In one preferred embodiment, the third polymer is a light, fine powder in its dehydrated state. In a preferred embodiment, the third polymer is a granular cross-linked sodium polyacrylate super-absorbent polymer.

In a preferred embodiment, the third polymer is mixed with water and can be instantly sculpted and formed into, for example, FIG. 16. In one embodiment, approximately one teaspoon of the third polymer can be hydrated by four to eight ounces of water. In a preferred embodiment, the third polymer is such that approximately one teaspoon of the polymer is best hydrated by approximately four ounces of water. In this preferred embodiment, when the polymer and water mixture is mixed to effect consistent texture and moisture, FIG. 16 can be easily formed by hand. In a preferred embodiment, these FIG. 16 can resemble snowmen, snowwomen, snow animals, snow mounds, snow banks, snow balls, snow forts, and the like, or a combination thereof. In a preferred embodiment, the polymer is clear or white.

In one embodiment of the present invention, decorative accessories are provided in the kit. These decorative accessories can range, without limitation, from small accessories 40 for snowmen, such as eyes, buttons, hats and twigs/arms, to glitter, seasonally-themed foam shapes, and the like. The decorative accessories are provided in the kit to further foster creativity and/or enhance the appeal of the scenic display with a winter theme.

In a preferred embodiment, the eye and button decorative accessories 40 consist primarily of a polymer. In a further preferred embodiment, the eye and button decorative accessories 40 consist primarily of a super-absorbent polymer, similar or identical to the first polymer. In a preferred embodiment, the eye and button decorative accessories 40 are spherical shapes. In a preferred embodiment, the decorative accessories 40 are colored (any color except clear or white).

In one embodiment of the present invention, the kit further comprises a display tray 42, which serves as a base or stand for the scenic display with a winter theme. The display tray 42 allows the scene to be easily moved and provides small children with a defined area for the scenic display with a winter theme, thus aiding clean-up. In a preferred embodiment, the display tray 42 is clear.

In one embodiment of the present invention, the kit further comprises an instruction set. The instruction set can outline the correct proportions of each polymer to water for the best hydration results. The instruction set can further provide safety information about the materials included in the kit. The instruction set may also provide ideas or examples of other scenic displays with a winter theme which can help a small child better understand how to use the kit. The instruction set may further provide appropriate methods and information for clean-up, disposal, storage and reuse of the items included in the kit.

In one embodiment of the present invention, the kit can further provide mixing utensils to facilitate the use of the kit. For example without limitation, the kit could provide mixing spoons or cups with suggested volumes pre-marked, to aid in the measuring and/or hydration process. By way of further non-limiting example, the kit could contain mixing spoons so the user does not have to use their own mixing utensils.

In one preferred embodiment of the present invention, the kit further provides accessories which can be used to sculpt the polymers. For example without limitation, the kit could provide sculpting spoons and/or molds, to aid in the creation of FIG. 16, snow base 14, and the like.

In one embodiment of the present invention, the kit comprises approximately two to five grams of the first polymer. In this embodiment, the kit further comprises approximately forty grams of the second polymer. In this embodiment, the kit further comprises approximately twelve grams of the third polymer. However, kits are contemplated with any amount of the three polymers, including up to 100 grams each and/or up to 200 grams each of the first polymer, the second polymer, and the third polymer.

Having described the invention in detail, it will be apparent that modifications and variations are possible without departing the scope of the invention defined in the appended claims. Furthermore, it should be appreciated that all examples in the present disclosure are provided as non-limiting examples.

What is claimed is:

1. A kit, comprising:
   a first liquid-absorbing polymer material comprising particles having a spherical shape and a cubical shape, wherein the first polymer material is a cross-linked polyacrylamide polymer;
   a second liquid-absorbing polymer material comprising particles having a granular shape, wherein the second polymer material is an ionic copolymer of polyacrylamide and acrylic acid, and sodium salts thereof;
   a third liquid-absorbing polymer material comprising particles having a granular shape, wherein the third polymer material is a cross-linked sodium polyacrylate polymer;
   a fourth liquid-absorbing polymer material comprising particles having a spherical shape, wherein the fourth polymer material is a cross-linked polyacrylamide polymer and wherein the first, second, and third polymer particles are clear or white and the fourth polymer particles are a color other than clear or white;
   a tray; and
   an instruction set comprising instructions for hydrating the first, second, and third particles with a liquid and creating a scenic display on the tray, the scenic display having a winter theme comprising items resembling snow balls formed from the hydrated first polymer material having a spherical shape; snow- or ice-resembling structures selected from walls, igloos, and snow forts formed from the hydrated first polymer having a cubical shape; a base layer resembling snow formed from the hydrated second polymer material; and snow-resembling figures formed from the hydrated third polymer, the snow-resembling figures including decorative accessories consisting of fourth polymer particles.

2. The kit of claim 1 further comprising mixing utensils.

3. The kit of claim 1 further comprising sculpting accessories.

4. The kit of claim 1 wherein the liquid is water.

\* \* \* \* \*